US012084296B2

(12) United States Patent
Shinomiya et al.

(10) Patent No.: US 12,084,296 B2
(45) Date of Patent: Sep. 10, 2024

(54) MOVABLE HARVESTING APPARATUS AND HARVESTING UNIT

(71) Applicant: YAMAHA HATSUDOKI KABUSHIKI KAISHA, Iwata (JP)

(72) Inventors: Masamitsu Shinomiya, Shizuoka (JP); Tomoyoshi Utsumi, Shizuoka (JP); Shuhei Matsushima, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 489 days.

(21) Appl. No.: 17/471,269

(22) Filed: Sep. 10, 2021

(65) Prior Publication Data
US 2022/0081226 A1 Mar. 17, 2022

(30) Foreign Application Priority Data

Sep. 14, 2020 (JP) .................. 2020-153799

(51) Int. Cl.
B65G 47/91 (2006.01)
A01D 46/24 (2006.01)
A01D 46/30 (2006.01)
B25J 5/00 (2006.01)
B25J 15/06 (2006.01)

(52) U.S. Cl.
CPC ........... B65G 47/917 (2013.01); A01D 46/24 (2013.01); A01D 46/30 (2013.01); B25J 5/007 (2013.01); B25J 15/0641 (2013.01)

(58) Field of Classification Search
CPC ....... A01D 46/24; A01D 46/30; B65G 47/917
See application file for complete search history.

(56) References Cited

U.S. PATENT DOCUMENTS

| 4,741,567 | A | * | 5/1988 | Zimmer | B25J 15/0616 414/737 |
| 5,555,601 | A | * | 9/1996 | Schultz | A47L 5/24 15/419 |
| 9,462,749 | B1 | * | 10/2016 | Jens | G06T 7/0004 |
| 10,059,009 | B1 | * | 8/2018 | Bronowski | G07F 17/0071 |
| 11,565,284 | B2 | * | 1/2023 | Chi | A01D 46/005 |
| 2005/0126144 | A1 | * | 6/2005 | Koselka | A01D 46/30 56/10.2 R |
| 2006/0213167 | A1 | * | 9/2006 | Koselka | A01D 75/00 56/10.2 A |
| 2008/0010961 | A1 | * | 1/2008 | Gray | B25J 9/0084 901/46 |

(Continued)

FOREIGN PATENT DOCUMENTS

| AU | 2019327467 | B2 | * | 3/2022 | ........... A01D 46/005 |
| CN | 102217461 | A | * | 10/2011 | |

(Continued)

Primary Examiner — Adam J Behrens
Assistant Examiner — Ashley A Kaercher
(74) Attorney, Agent, or Firm — Keating & Bennett, LLP

(57) ABSTRACT

A movable harvesting apparatus includes an end effector including a suction port to suction a harvest object, a vacuum generator, vacuum spaces in which a vacuum is generated by the vacuum generator, a switching valve disposed in a path from the vacuum spaces to the suction port, and a controller to control opening and closing of the switching valve. The harvesting apparatus reduces wasteful energy consumption required for harvesting.

10 Claims, 9 Drawing Sheets

(56) References Cited

U.S. PATENT DOCUMENTS

| | | | | |
|---|---|---|---|---|
| 2011/0022231 A1* | 1/2011 | Walker | | A01M 7/0042 |
| | | | | 901/14 |
| 2016/0150729 A1* | 6/2016 | Moore | | A01G 3/08 |
| | | | | 701/50 |
| 2017/0273241 A1* | 9/2017 | Salisbury | | A01D 46/24 |
| 2018/0092304 A1* | 4/2018 | Moore | | A01D 46/24 |
| 2020/0196528 A1* | 6/2020 | Salisbury | | A01D 46/005 |
| 2020/0246839 A1* | 8/2020 | Chi | | A01D 46/005 |
| 2021/0147080 A1* | 5/2021 | Crowley | | B64D 1/22 |
| 2021/0267125 A1* | 9/2021 | Lu | | A01D 46/30 |
| 2021/0368680 A1* | 12/2021 | Wisdom | | A01D 46/30 |
| 2021/0368685 A1* | 12/2021 | Wisdom | | G06V 20/188 |
| 2021/0368686 A1* | 12/2021 | Wisdom | | B25J 9/1697 |
| 2022/0081226 A1* | 3/2022 | Shinomiya | | B65G 47/917 |
| 2023/0074568 A1* | 3/2023 | Shimomura | | A01D 46/24 |

FOREIGN PATENT DOCUMENTS

| | | | | | |
|---|---|---|---|---|---|
| CN | 102577755 | A | * | 7/2012 | |
| CN | 102217461 | B | | 1/2013 | |
| CN | 107205340 | A | * | 9/2017 | A01D 46/005 |
| CN | 107258227 | A | * | 10/2017 | |
| CN | 107409626 | A | * | 12/2017 | |
| CN | 108200809 | A | * | 6/2018 | |
| CN | 108271532 | A | * | 7/2018 | A01D 46/30 |
| CN | 108605511 | A | * | 10/2018 | A01D 46/22 |
| CN | 108718689 | A | * | 11/2018 | |
| CN | 108934451 | A | * | 12/2018 | A01D 46/20 |
| CN | 110063133 | A | * | 7/2019 | |
| CN | 110248536 | A | * | 9/2019 | A01D 46/22 |
| CN | 110832991 | B | * | 7/2021 | A01D 46/30 |
| CN | 113207436 | A | * | 8/2021 | A01D 46/22 |
| CN | 113352335 | A | * | 9/2021 | |
| CN | 114365624 | A | * | 4/2022 | |
| CN | 114451149 | A | * | 5/2022 | |
| CN | 114747617 | A | * | 7/2022 | |
| CN | 115067074 | A | * | 9/2022 | |
| CN | 115226496 | A | * | 10/2022 | |
| CN | 115316129 | A | * | 11/2022 | |
| CN | 116048082 | A | * | 5/2023 | |
| CN | 116058178 | A | * | 5/2023 | |
| CN | 116097980 | A | * | 5/2023 | |
| CN | 116097981 | A | * | 5/2023 | |
| CN | 115136793 | B | * | 6/2023 | |
| CN | 116326348 | A | * | 6/2023 | |
| CN | 116369055 | A | * | 7/2023 | |
| CN | 116616044 | A | * | 8/2023 | |
| CN | 116406568 | B | * | 11/2023 | A01D 46/30 |
| CN | 116439018 | B | * | 1/2024 | |
| DE | 102015111682 | A1 | * | 2/2017 | A01D 46/24 |
| EP | 270469 | A | * | 6/1988 | A01D 46/24 |
| EP | 4176704 | A1 | * | 5/2023 | A01D 46/24 |
| JP | 652-12672 | B | | 4/1977 | |
| JP | 07-4097 | B2 | | 1/1995 | |
| JP | 07246015 | A | * | 9/1995 | |
| JP | 08-89048 | A | | 4/1996 | |
| JP | 08238015 | A | * | 9/1996 | |
| JP | 10229728 | A | * | 9/1998 | |
| JP | 3017448 | B2 | * | 3/2000 | |
| JP | 2001095348 | A | * | 4/2001 | |
| JP | 3243673 | B2 | | 1/2002 | |
| JP | 3286821 | B2 | * | 5/2002 | |
| JP | 2002361586 | A | * | 12/2002 | B25J 15/0641 |
| JP | 2003062781 | A | * | 3/2003 | |
| JP | 3493801 | B2 | * | 2/2004 | |
| JP | 2010207118 | A | | 9/2010 | |
| JP | 5212672 | B2 | * | 6/2013 | B60K 6/365 |
| JP | 5810494 | B2 | * | 11/2015 | |
| JP | 2017079699 | A | * | 5/2017 | |
| JP | 2020195335 | A | * | 12/2020 | |
| JP | 2021036821 | A | * | 3/2021 | |
| JP | 3243673 | U | * | 9/2023 | |
| WO | WO-2006013593 | A1 | * | 2/2006 | A01D 46/30 |
| WO | WO-2006056256 | A2 | * | 6/2006 | B21J 15/043 |
| WO | WO-2008037035 | A1 | * | 4/2008 | A01D 46/30 |
| WO | WO-2009030108 | A1 | * | 3/2009 | A01D 46/30 |
| WO | WO-2015095661 | A1 | * | 6/2015 | A01D 46/24 |
| WO | WO-2018057562 | A1 | * | 3/2018 | A01D 46/22 |
| WO | WO-2018178221 | A1 | * | 10/2018 | B25B 11/005 |
| WO | WO-2019187714 | A1 | * | 10/2019 | A01D 46/24 |
| WO | WO-2021242694 | A1 | * | 12/2021 | A01D 45/001 |
| WO | WO-2023046295 | A1 | * | 3/2023 | |
| WO | WO-2023154267 | A1 | * | 8/2023 | |
| WO | WO-2023235922 | A1 | * | 12/2023 | |

* cited by examiner

FIG.6
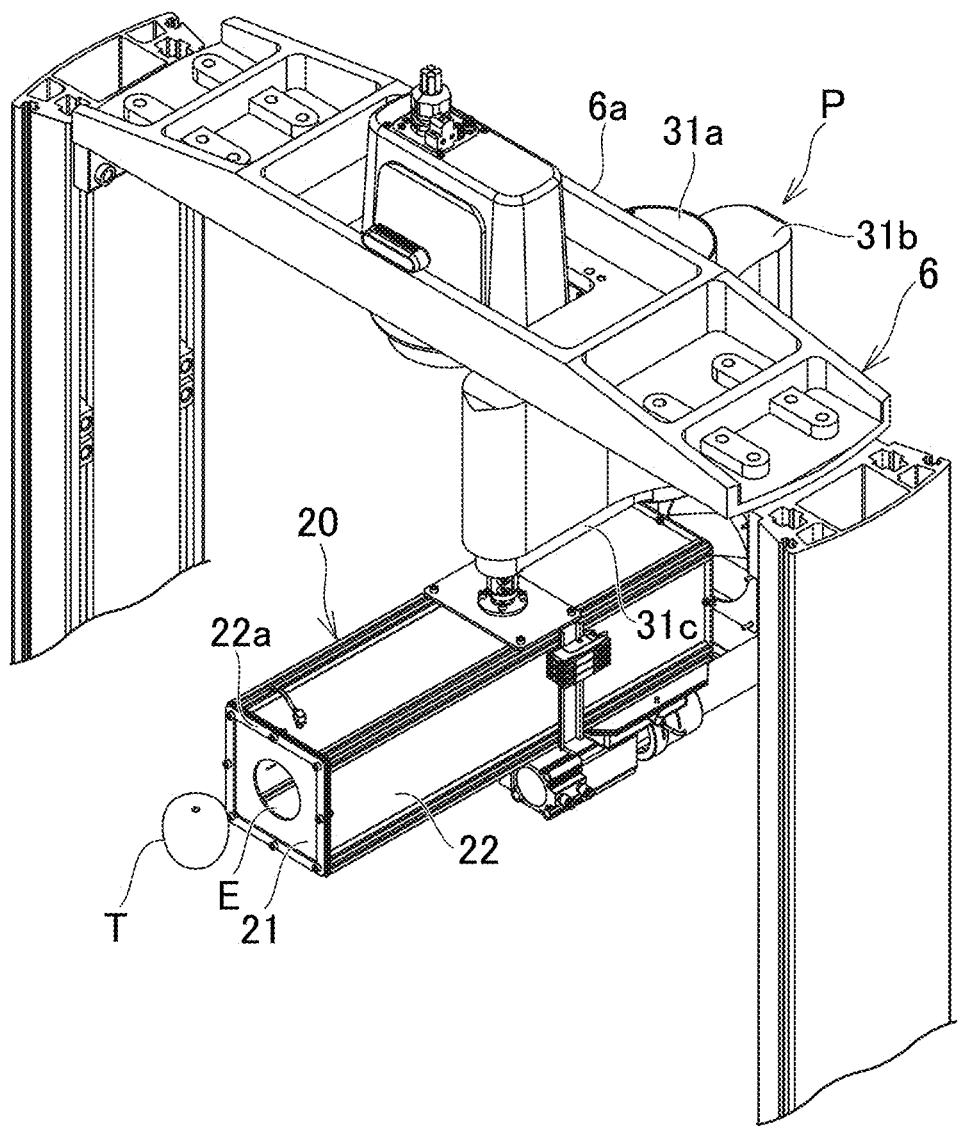
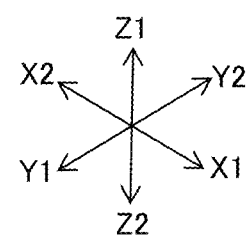

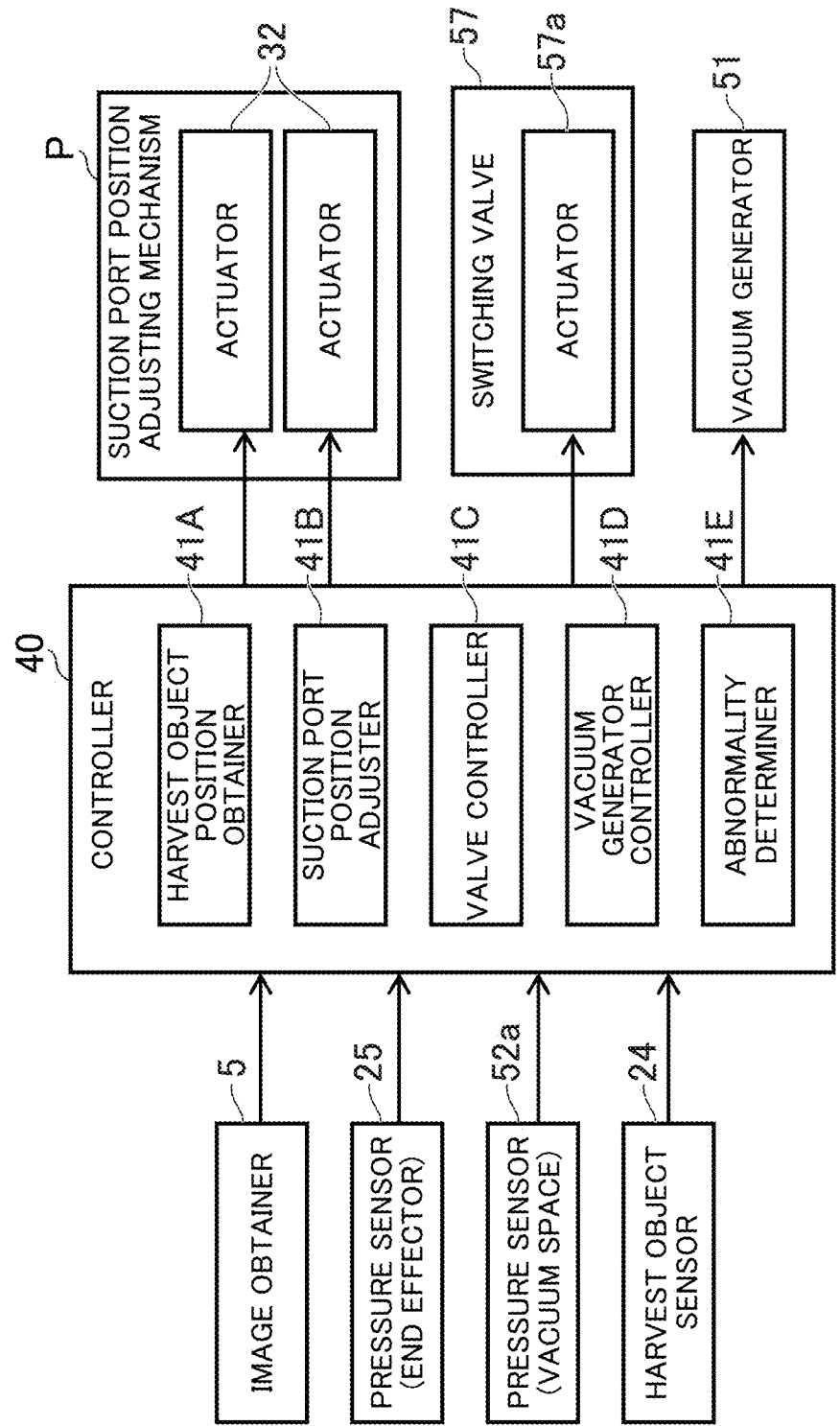

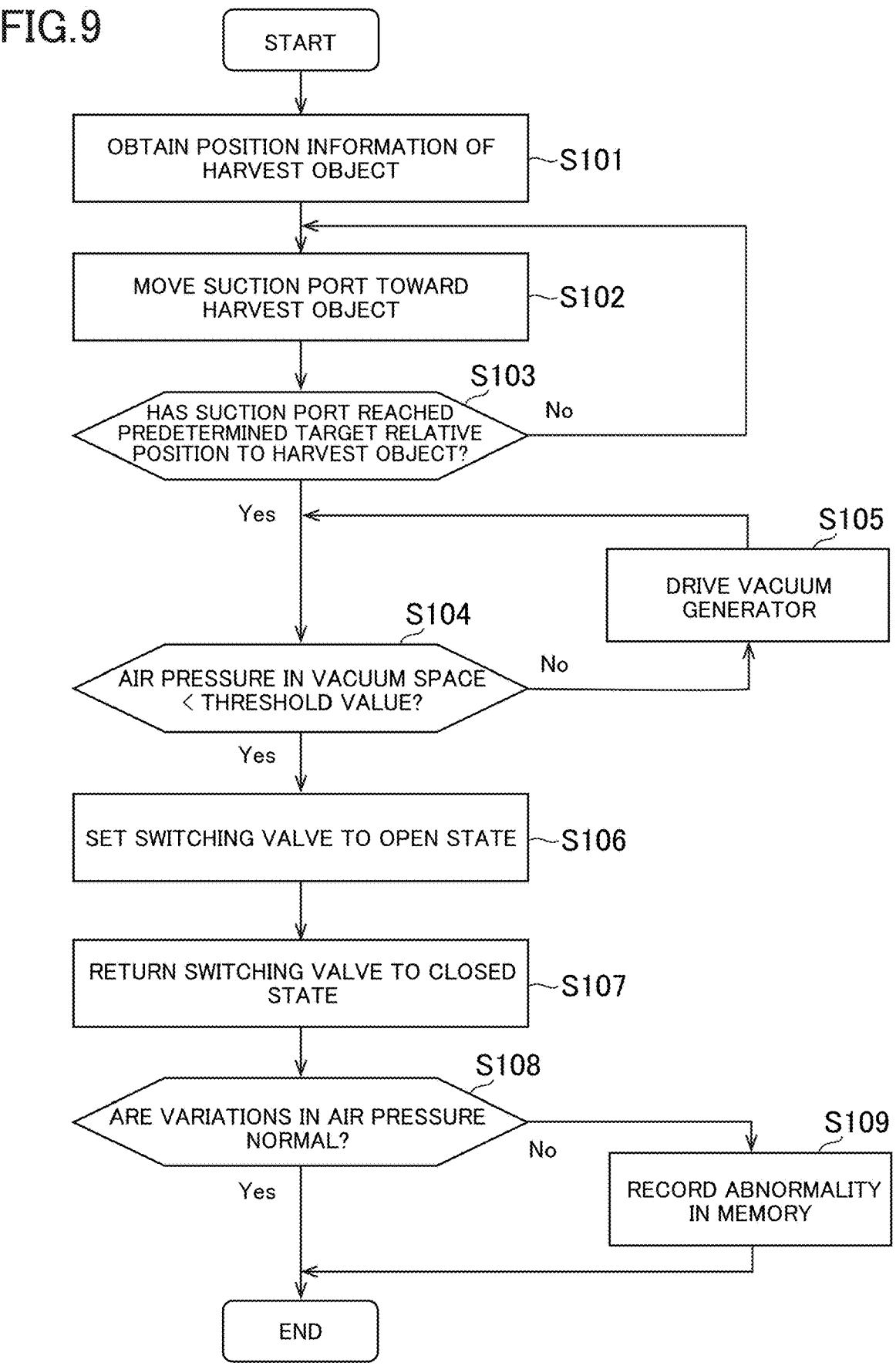

MOVABLE HARVESTING APPARATUS AND HARVESTING UNIT

CROSS-REFERENCE TO RELATED APPLICATION

The present application claims priority from Japanese application JP 2020-153799 filed on Sep. 14, 2020, the entire contents of which are hereby incorporated by reference into this application.

BACKGROUND OF THE INVENTION

1. Field of the Invention

The present disclosure relates to a movable harvesting apparatus and a harvesting unit.

2. Description of the Related Art

Harvesting apparatuses for sucking in harvest objects, such as fruit, by a vacuum pump have been proposed. For example, the harvesting apparatus of Japanese Unexamined Patent Application Publication No. JPH07-246015A sucks in harvest objects by the tip end (suction part) of the harvesting hand 4 and accumulates the harvest objects in the temporary storage part 32 attached to the rear portion of the harvesting hand 4. The harvest objects are then sent to the storage cage 44 away from the temporary storage part 32 to be stored. The suction air tube 33 is connected to the side surface of the temporary storage part 32. In addition to Japanese Unexamined Patent Application Publication No. JPH07-246015A, Japanese Unexamined Patent Application Publication No. JPH08-089048A, Japanese Unexamined Patent Application Publication No. JPH08-238015A, Japanese Unexamined Patent Application Publication No. JPH10-229728A, Japanese Patent Nos. 3,243,673 and 3,286,821, and Japanese Examined Patent Application Publication No. JPH03-017448 also disclose harvesting apparatuses for sucking in harvest objects.

In the conventional technique, the harvesting hand and the vacuum generator are directly connected to each other, which causes the following problems. The vacuum generator needs to be always driven to suck in a harvest object. This causes the problem of wasteful energy consumption. Further, the sucking force is important in order to properly suck in the harvest objects, but the conventional technique has difficulty in adjusting the sucking force.

SUMMARY OF THE INVENTION

A movable harvesting apparatus according to a preferred embodiment of the present invention includes a movable cart, an image obtainer to obtain an image including a harvest object shown thereon, a harvest object position obtainer to obtain position information of the harvest object based on the image, an end effector including a suction port to suck in the harvest object, a position adjuster to move the suction port toward the harvest object based on the position information of the harvest object, a vacuum generator, a vacuum space in which a vacuum is generated by the vacuum generator, a switching valve disposed in a path from the vacuum space to the suction port, and a controller configured or programmed to control opening and closing of the switching valve. The movable harvesting apparatus facilitates adjusting a sucking force using the switching valve. Alternatively, even if the vacuum generator is temporarily stopped, a vacuum that has been generated in the vacuum space by temporarily setting the switching valve to an open state enables the harvest object to be sucked in.

In a movable harvesting apparatus according to a preferred embodiment of the present invention, the controller may be configured or programmed to control opening and closing of the switching valve based on a relative position between the harvest object and the end effector. This enables appropriate suction.

In a movable harvesting apparatus according to a preferred embodiment of the present invention, the end effector may include an internal passage in which the harvest object sucked in from the suction port moves.

In a movable harvesting apparatus according to a preferred embodiment of the present invention, the end effector may include a first pressure sensor to detect an air pressure of the internal passage, and the controller may be configured or programmed to control the switching valve based on an output of the first pressure sensor. This structure is able to stop sucking of the harvest object when an abnormality in the end effector (e.g., remaining foreign substances) occurs, for example.

In a movable harvesting apparatus according to a preferred embodiment of the present invention, the internal passage may include an inner surface along a direction in which the harvest object moves and a connection port that opens to the inner surface, and the vacuum space may be connected to the connection port. This structure prevents the connection port from interfering with the movement of the harvest object in the internal passage.

In a movable harvesting apparatus according to a preferred embodiment of the present invention, the end effector may include the suction port on one side of the internal passage in a moving direction of the harvest object, and include a discharge port to discharge the harvest object on another side of the internal passage in the moving direction of the harvest object. This structure accumulates a plurality of the harvest objects at a position spaced away from the end effector in a discharging direction. As a result, the harvesting work efficiency is improved.

In a movable harvesting apparatus according to a preferred embodiment of the present invention, the end effector may include a closer to close the internal passage so as to impede a flow of air from the discharge port to outside and allow the harvest object to be discharged from the discharge port to the outside. Such a closer facilitates sufficiently lowering the air pressure in the internal passage of the end effector at the time when the harvest object is sucked in.

In a movable harvesting apparatus according to a preferred embodiment of the present invention, the end effector may include a sensor to detect the harvest object in the internal passage. This facilitates determining whether harvesting has been appropriately performed based on an output of the sensor.

In a movable harvesting apparatus according to a preferred embodiment of the present invention, the end effector may include an internal passage in which the harvest object sucked in from the suction port moves, and a volume of the vacuum space may be larger than a volume of the internal passage. This facilitates maintaining the air pressure of the vacuum space at a low pressure.

A movable harvesting apparatus according to a preferred embodiment of the present invention may further include a vacuum chamber in the vacuum space. This structure further facilitates maintaining the air pressure of the vacuum space at a low pressure.

A movable harvesting apparatus according to a preferred embodiment of the present invention may further include a second pressure sensor to detect an air pressure of the internal passage, and the controller may be configured or programmed to control the switching valve based on an output of the second pressure sensor. This structure improves or optimizes the sucking force acting on the harvest object.

A harvesting unit according to a preferred embodiment of the present invention may include an end effector including a suction port to suck in a harvest object, a vacuum generator, a vacuum space in which a vacuum is generated by the vacuum generator, a switching valve disposed in a path from the vacuum space to the suction port, and a controller configured or programmed to control opening and closing of the switching valve. The harvesting unit facilitates adjusting the sucking force by the switching valve. Alternatively, even if the vacuum generator is temporarily stopped, a vacuum that has been generated in the vacuum space by temporarily setting the switching valve to an open state enables the harvest object to be sucked into the vacuum space.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6 is a perspective view of a position adjuster to move a position of the end effector.

FIG. 8 is a block diagram showing elements of the movable harvesting apparatus.

FIG. 9 is a flow chart showing a process executed by a controller.

DETAILED DESCRIPTION OF THE PREFERRED EMBODIMENTS

The terminology used herein is for the purpose of describing particular preferred embodiments only and is not intended to be limiting of the present invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises", "comprising", "includes", and/or "including", when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which preferred embodiments of the present invention belong. It will be further understood that terms, such as those defined in commonly used dictionaries, should be interpreted as having a meaning that is consistent with their meaning in the context of the relevant art and the present disclosing and will not be interpreted in an idealized or overly formal sense unless expressly so defined herein.

In describing preferred embodiments of the present invention, it will be understood that a number of technologies are disclosed. Each of these has individual benefit and each can also be used in conjunction with one or more, or in some cases all, of the other disclosed technologies. Accordingly, for the sake of clarity, this description will refrain from repeating every possible combination of the individual technologies in an unnecessary fashion. Nevertheless, the specification and claims should be read with the understanding that such combinations are entirely within the scope of the present invention and the claims.

In the following description, for purposes of explanation, numerous specific details are set forth in order to provide a thorough understanding of the present invention. It will be evident, however, to one skilled in the art that the present invention may be practiced without these specific details.

Preferred embodiments of the present disclosure are to be considered as exemplifications of the present invention, and are not intended to limit the present invention to the specific preferred embodiments illustrated by the figures or description below.

Figure 1:
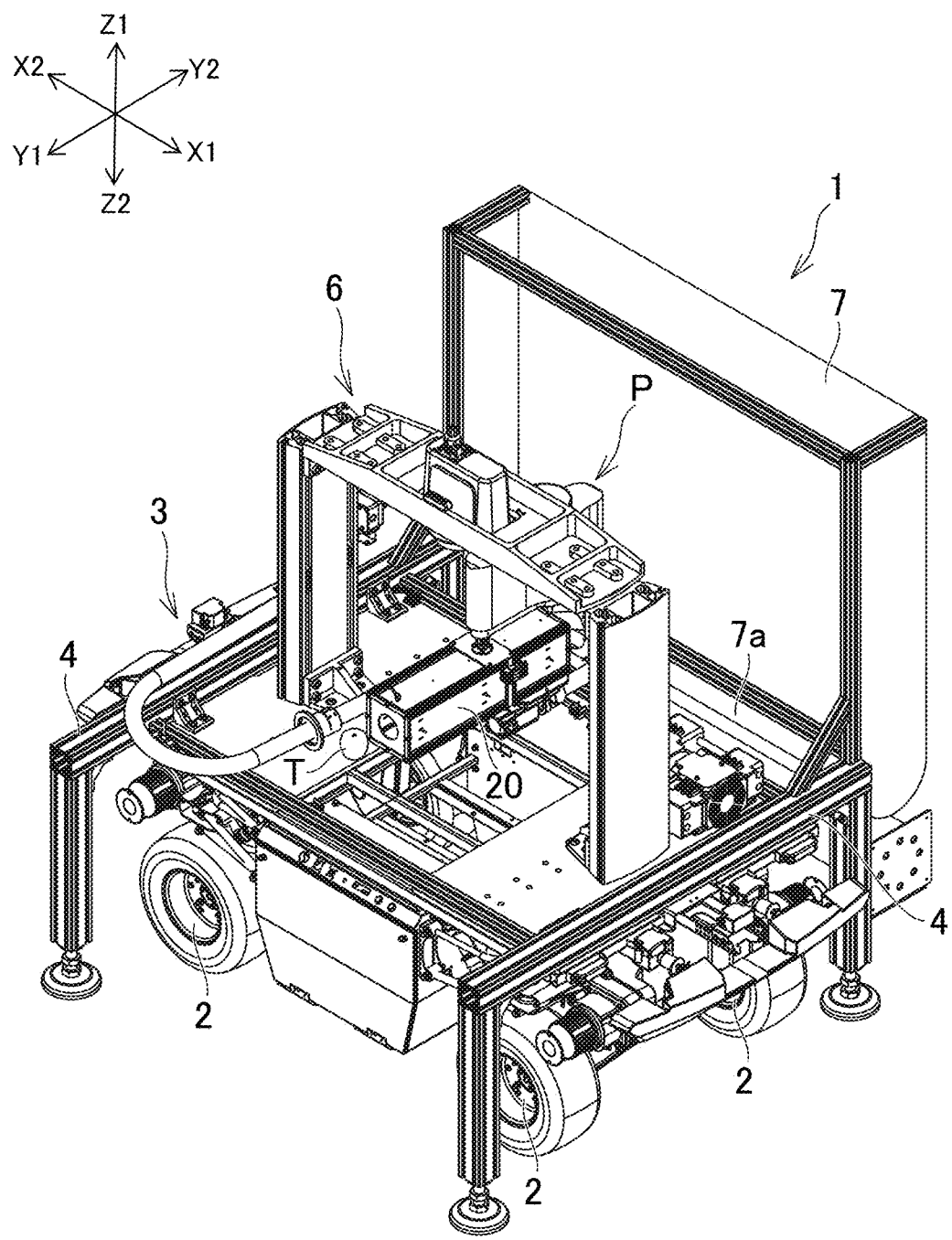
FIG. 1 is a perspective view of a movable harvesting apparatus according to a preferred embodiment of the present invention.

The present invention will now be described by referencing the appended figures representing preferred embodiments. In the following, Y1 and Y2 shown in FIG. 1 are referred to as front and rear, Z1 and Z2 are referred to as upper and lower, respectively, and X1 and X2 are referred to as right and left, respectively.

A movable harvesting apparatus 1 is an apparatus for automatically harvesting various kinds of agricultural products (including fruits and vegetables), such as apples, pears, tomatoes, and green peppers, while moving on a farm. The harvesting apparatus 1 includes a cart 3 including a plurality of wheels 2. The cart 3 is provided with outriggers 4 to support the cart 3. The harvesting apparatus 1 may not have the outriggers 4.

The cart 3 includes a suction system B (see FIG. 3) including an end effector 20 to suck in agricultural products and a suction port position adjuster P (hereinafter may be simply referred to as "position adjuster P") to move the position of the end effector 20 toward a harvest object T (that is, an agricultural product). For example, while moving on a farm, the harvesting apparatus 1 moves a suction port E of the end effector 20 toward a harvest object T to harvest (suck in) the harvest object T.

Figure 7:
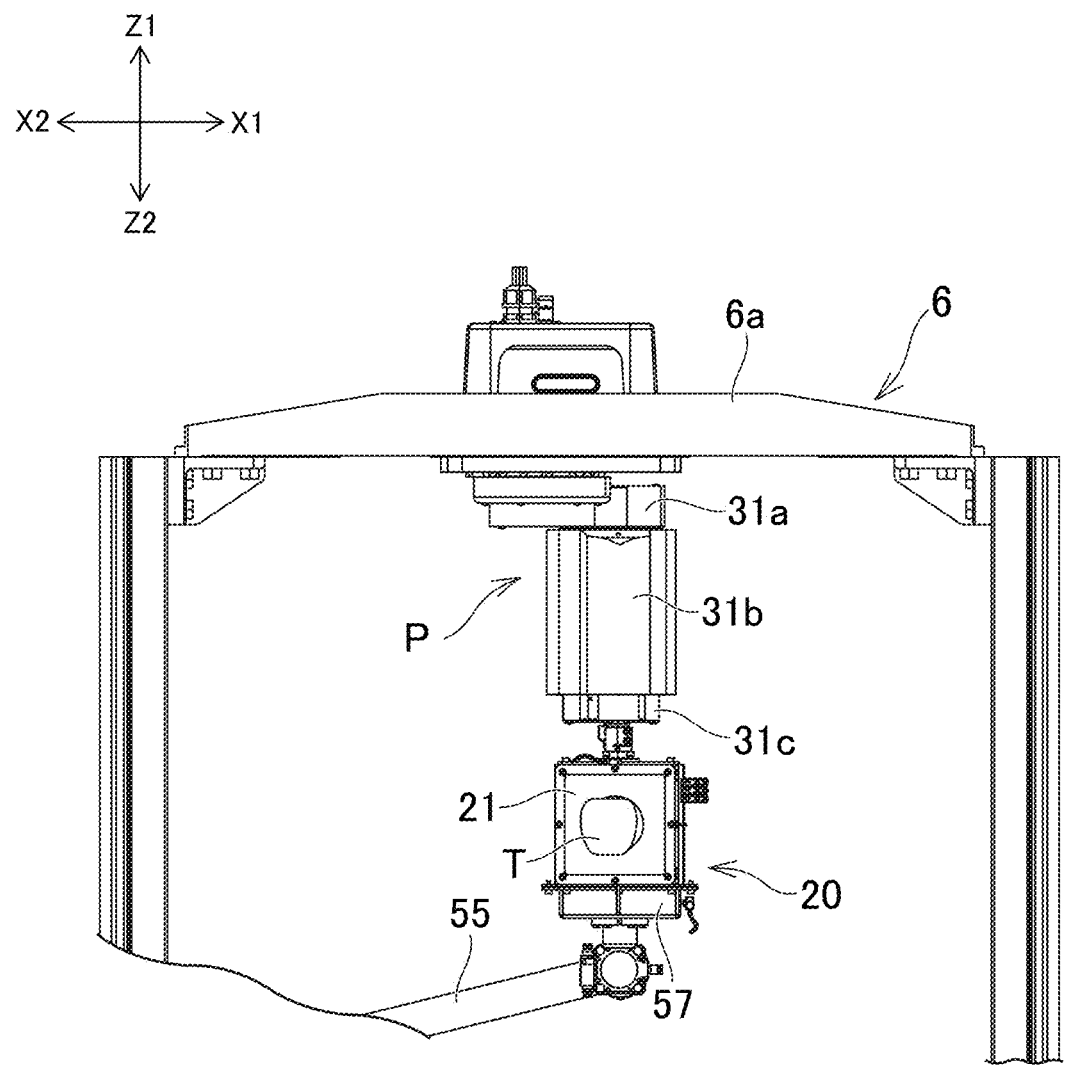
FIG. 7 is a front view of the position adjuster.

The suction port position adjuster P moves the position and attitude of the end effector 20 (the position and orientation of the suction port E). As shown in FIGS. 6 and 7, for example, the suction port position adjuster P includes a plurality of movable portions 31a, 31b, and 31c and a plurality of actuators 32 (see FIG. 8) to move the movable portions 31a, 31b, and 31c. The suction port position adjuster P may move the position of the end effector 20 in three directions (front-rear direction, left-right direction, vertical direction) perpendicular to each other, for example. Further, the suction port position adjuster P may move the orientation of the end effector 20 (e.g., pitch and yaw angles of the end effector 20). (Here, the pitch angle is an angular position of the end effector 20 around a straight line along the left-right direction, and the yaw angle is an angular position of the end effector 20 around the vertical line). The degree of freedom of movement of the end effector 20 is not limited to the example described above.

As shown in FIG. 6, the harvesting apparatus 1 may include a support frame 6 fixed to the cart 3. The end effector 20 is suspended from the uppermost portion 6a of the support frame 6 through the movable portions 31a, 31b, and 31c. The support structure of the end effector 20 is not limited to the example shown in FIG. 6, and may be modified as appropriate.

As shown in FIG. 8, the movable harvesting apparatus 1 includes an image obtainer 5. The image obtainer 5 obtains an image including a harvest object T growing around the cart 3, and inputs such image data to a controller 40, which will be described below. The movable harvesting apparatus 1 may include a plurality of image obtainers 5 installed at different positions, or may have a plurality of types of image obtainers 5. For example, the movable harvesting apparatus 1 may have one or more visible-light cameras or infrared cameras as the image obtainer 5.

The controller 40 (see FIG. 8) includes a microprocessor and a memory to store programs executed by the microprocessor, for example. The controller 40 executes the programs to drive the actuators 32 of the suction port position adjuster P or to move the end effector 20. Further, the controller 40 obtains position information of the harvest object T from the image obtained by the image obtainer 5, and moves the end effector 20 toward such a position. The position information includes, for example, the coordinates of the harvest object T in the coordinate system defined for the cart 3. The process performed by the controller 40 will be described below.

The controller 40 may not necessarily be mounted on the cart 3. The controller 40 may be installed at a location spaced away from the cart 3. The controller 40 may control the actuators 32 wirelessly.

Figure 3:
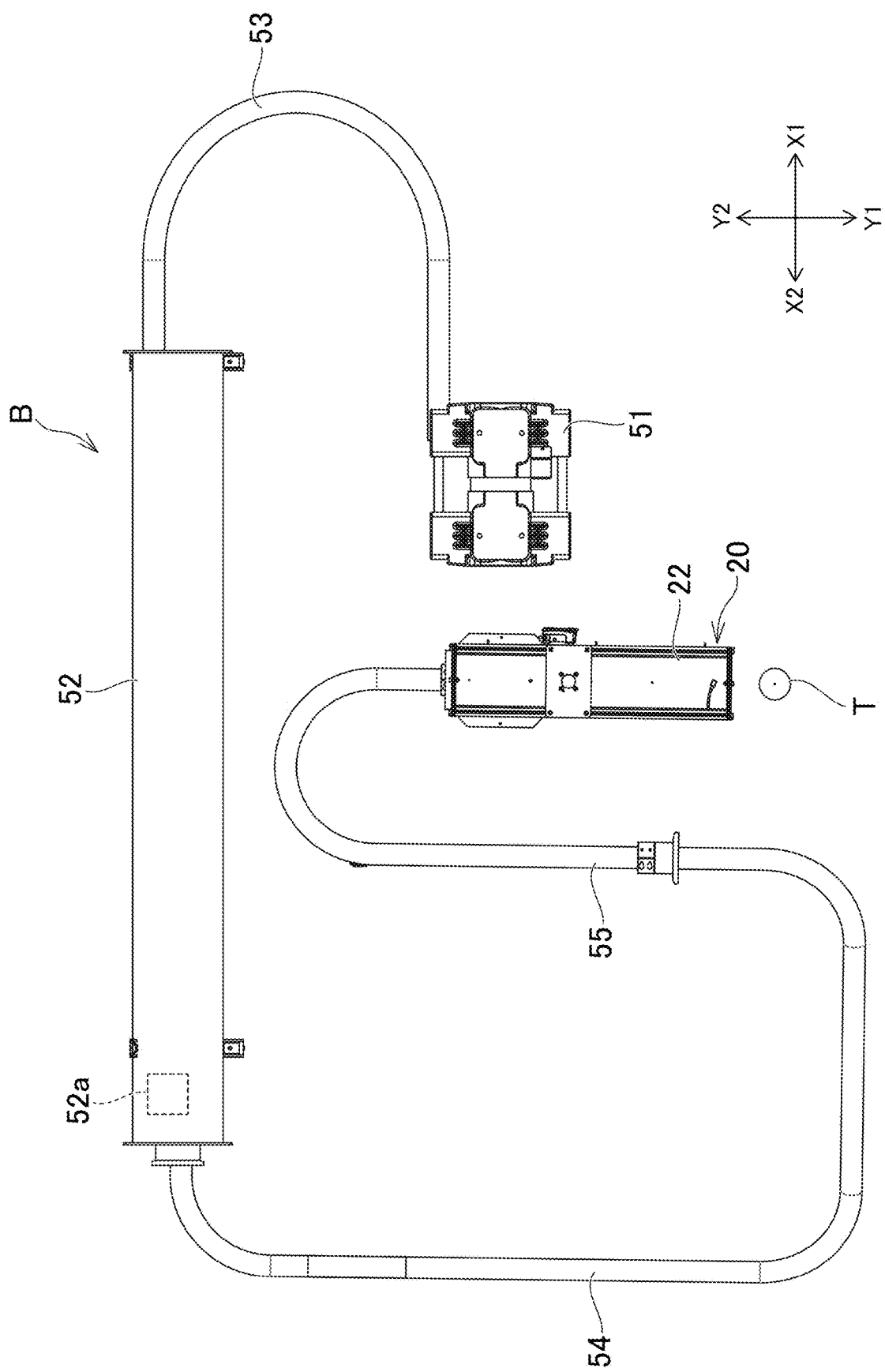
FIG. 3 is a plan view of a suction system.

As shown in FIG. 3, the suction system B includes the end effector 20, the vacuum generator 51, and the vacuum chamber 52. The vacuum generator 51 is connected to the end effector 20 through the vacuum chamber 52. The end effector 20 and the vacuum chamber 52 are connected to each other through a pipe 53, and the vacuum chamber 52 and the vacuum generator 51 are connected to each other through pipes 54 and 55. The equipment and components defining the suction system B and the controller 40 define the harvesting unit.

The end effector 20 is cylindrical, for example, and as shown in FIG. 6, includes the suction port E on its front surface (end surface on the front side). In the example shown in FIG. 6, the end effector 20 is rectangular in a front view. However, the shape of the end effector may be appropriately changed in accordance with the shape and size of the harvest object.

The end effector 20 includes an internal passage through which a harvest object T sucked in from the suction port E moves. The end effector 20 includes a discharge port G (see FIG. 5) at the rear end of the internal passage (the rear surface of the end effector 20). The end effector 20 sucks in a harvest object T from the suction port E by the action of the vacuum (negative pressure) generated by the vacuum generator 51. The sucked in harvest object T moves through the internal passage and is discharged rearward from the discharge port G.

The end effector 20 may include a cushion (e.g., rubber, elastomer, sponge) on the inner surface of the internal passage so as to protect the harvest object T.

The vacuum generator 51 includes a vacuum pump to discharge the air in the vacuum chamber 52 and the pipes 53, 54, and 55 to the outside and form a vacuum inside thereof. That is, the inside of the vacuum chamber 52 and the pipes 53, 54, and 55 defines a "vacuum space." The harvesting apparatus 1 uses the low air pressure generated in the vacuum space to suck in the harvest object T through the suction port E. In this specification, the vacuum space is a space in which a vacuum is generated by driving the vacuum generator 51 when a switching valve 57 is closed. The air pressure in the "vacuum space" is not particularly limited if the air pressure is low enough to suck in the harvest object T from the suction port of the end effector 20.

The suction system B includes the switching valve 57 (see FIG. 5) in the path from the vacuum space, which is defined by the vacuum chamber 52 and the pipes 53, 54, and 55, to the suction port E. The switching valve 57 is located at the end of the vacuum space. In the present example of the harvesting apparatus 1, the pipe 55 is connected to the end effector 20 via the switching valve 57. The switching valve 57 is connected (fixed) to the outer surface of the end effector 20.

For example, the switching valve 57 is used as follows. When a harvest object T is not sucked in, the controller 40 drives the vacuum generator 51 to generate a vacuum in the vacuum space (vacuum chamber 52, pipes 53, 54, 55) while closing the switching valve 57 (e.g., degree of opening: 0%). In this state, the vacuum space and the internal passage of the end effector 20 are not connected (the movement of air is interrupted by the switching valve 57), and the internal passage of the end effector 20 is equal or substantially equal to the atmospheric pressure. When the suction port position adjuster P operates the suction port E to approach a harvest object T and the relative position between the harvest object T and the suction port E reaches a predetermined target relative position, the controller 40 sets the switching valve 57 to the open state (e.g., degree of opening: 100%). This allows the vacuum space to connect to the internal passage of the end effector 20, thus allowing the air movement from the internal passage to the vacuum space. The air pressure in the internal passage of the end effector 20 then suddenly drops, and the harvest object T is sucked into the suction port E. The sucked harvest object T is discharged from the discharge port G (see FIG. 5) to the rearward of the end effector 20. When finishing the suctioning of the harvest object T, the controller 40 immediately returns the switching valve 57 to the closed state. The controller 40 may return the switching valve 57 to the closed state before the harvest object T reaches the discharge port G (i.e., while the harvest object T is moving through the internal passage).

Upon controlling the switching valve 57, the controller 40 may select one of the open state (e.g., degree of opening: 100%) and the closed state (e.g., degree of opening: 0%) according to the relative position between the harvest object T and the suction port E. As another example, the controller 40 may select a state between the open state and the closed state (e.g., degree of opening: 70%). With such control, the force of sucking in the harvest object T is able to be adjusted in accordance with the weight of the harvest object T and the distance between the harvest object T and the suction port E, for example. The control performed by the controller 40 will be described below in detail.

As shown in FIG. 3, the suction system B includes the vacuum chamber 52 as an element of the vacuum space. The vacuum chamber 52 has a flow path cross section larger than that of the pipes 53, 54, and 55. Here, the flow path cross section is a cross section perpendicular to the flow direction of the air toward the vacuum generator 51. The volume of the vacuum chamber 52 may be larger than the volume of the internal passage of the end effector 20. The vacuum chamber 52 easily maintains the air pressure of the vacuum space at a low air pressure. For example, in a case where a plurality of harvest objects T are successively sucked in, the vacuum space is also easily maintained at a low air pressure.

The total volume of the vacuum space (the volume of vacuum chamber 52 and pipes 53, 54, 55) is appropriately determined. The total volume of the vacuum space may be greater than the volume of the end effector 20. The total volume of the vacuum space may be greater than twice the volume of the end effector 20 or greater than three times the volume of the end effector 20, for example. Alternatively, the volume of the vacuum chamber 52 may be greater than twice the volume of the end effector 20 or greater than three times the volume of the end effector 20, for example.

The suction system B may not include the vacuum chamber 52. In this case, the vacuum generator 51 and the end effector 20 are connected to each other through a pipe, and the inside of the pipe defines and functions as a vacuum space. In this case, the volume of the vacuum space (volume of pipes) may be greater than the volume of the end effector 20, or may be greater than twice the volume of the end effector 20, for example.

Figure 5:
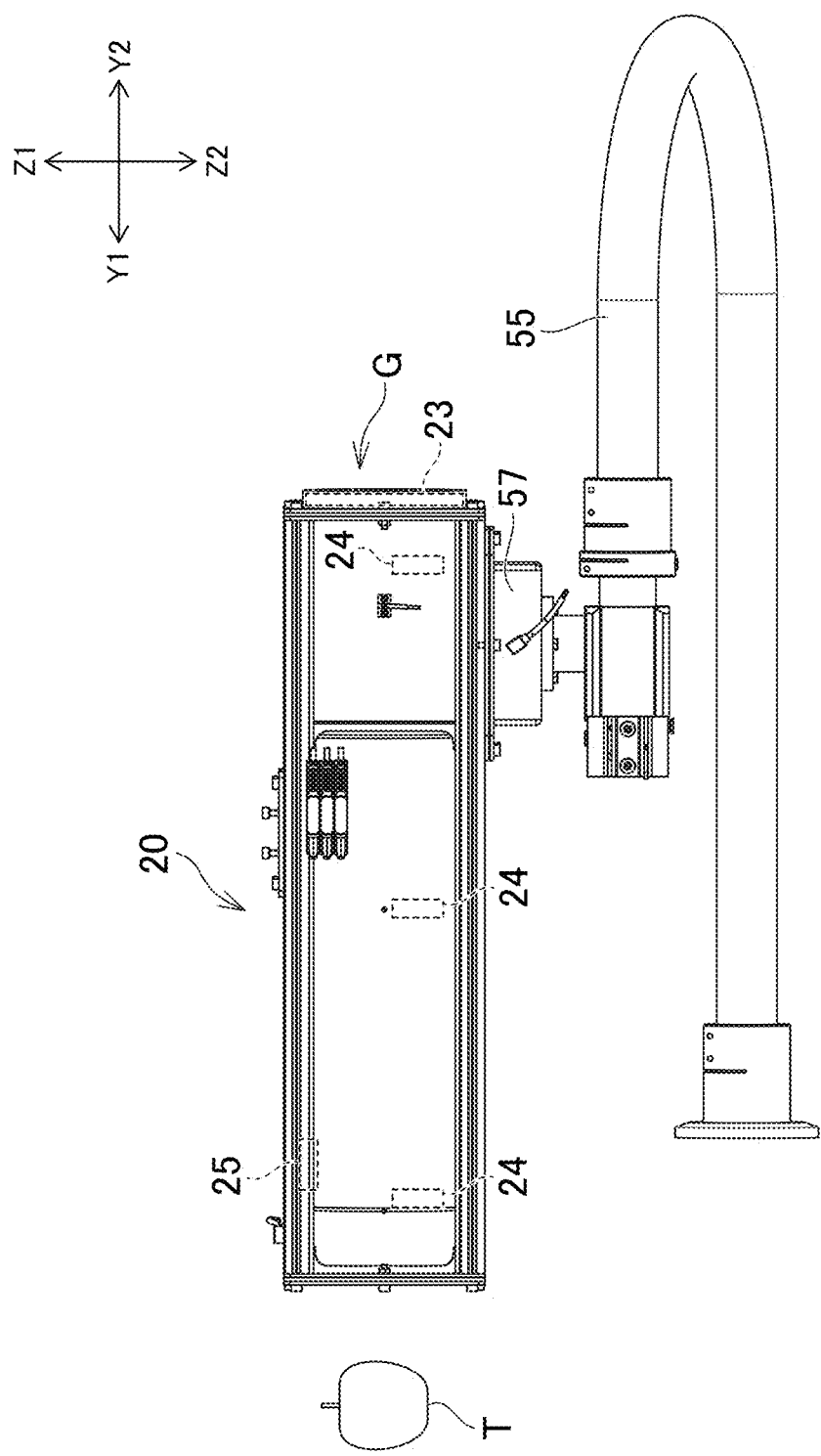
FIG. 5 is a side view of the end effector.

As shown in FIG. 5, the switching valve 57 is provided at the end of the pipe 55 and attached to the outer surface of the end effector 20. This layout of the switching valve 57 increases the volume of the vacuum space by driving the vacuum generator 51 when the switching valve 57 is in the closed state as compared to when the switching valve 57 is disposed close to the vacuum chamber 52, for example.

The location of the switching valve 57 is not limited to the present example of the harvesting apparatus 1. For example, the location of the switching valve 57 may not necessarily be at the end of the pipe 55 as long as the location is between the vacuum chamber 52 and the end effector 20.

The internal passage of the end effector 20 has an inner surface along the direction in which the harvest object T moves (i.e., the longitudinal direction of the end effector 20). The internal passage includes a connection port M (see FIG. 4), which is an opening, in the inner surface. The vacuum space (pipe 54) is connected to the connection port M. That is, the vacuum space is connected to the internal passage of the end effector 20 in a direction crossing the suctioning direction of the suction port E. This connection of the vacuum space (pipe 55) prevents the connection port M from interfering with the movement of the harvest object T in the internal passage. In the harvesting apparatus 1, the harvest object T sucked in from the suction port E is able to smoothly move to the discharge port G. The connection port M may include a filter to prevent foreign substances from entering the vacuum flow path.

Figure 4:
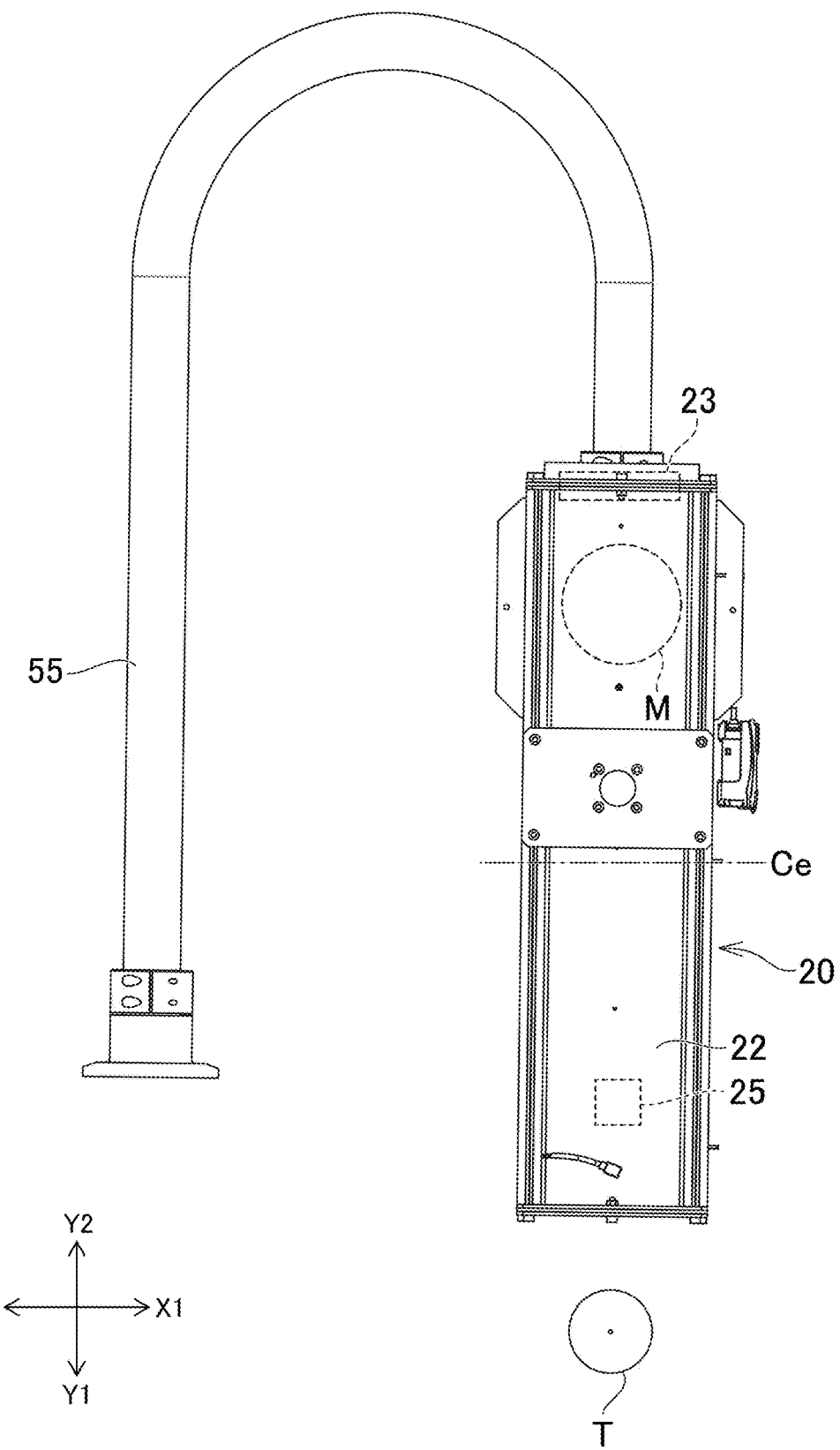
FIG. 4 is a plan view of an end effector provided at the end of the suction system.

As shown in FIG. 4, the connection port M is positioned rearward of the center Ce of the end effector 20 in the front-rear direction. The harvest object T sucked in from the suction port E accelerates in the area forward of the connection port M. In the structure in which the connection port M is located rearward of the center Ce, the area in which the harvest object T accelerates rearward is longer. This allows the harvest object T to be easily and smoothly discharged from the discharge port G of the end effector 20.

Figure 2:
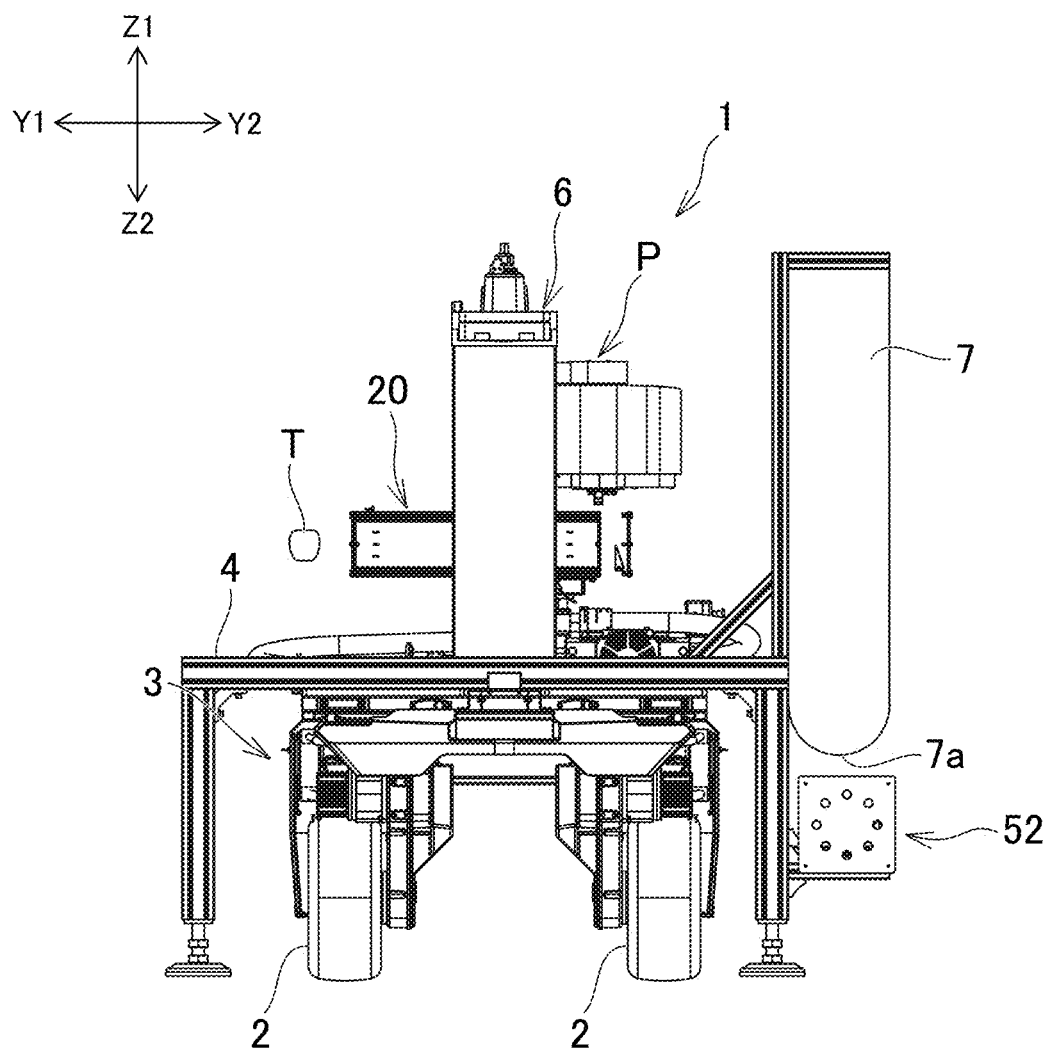
FIG. 2 is a side view of the movable harvesting apparatus.

As shown in FIG. 2, the harvesting apparatus 1 includes a receiving member 7 covering the rear side of the end effector 20. The receiving member 7 may be, for example, a net-like member made of a soft material or a wall made of a material having a cushioning property. The receiving member 7 includes a bottom portion 7a (see FIG. 1), which is located lower than the end effector 20. The harvest object T discharged from the discharge port G of the end effector 20 may be accumulated in the bottom portion 7a.

As shown in FIG. 6, the end effector 20 may include a protective film 21 at the suction port E. The protective film 21 may be a flexible member, such as a rubber and an elastomer. A hole (suction port E) through which the harvest object T passes is provided in the center of the protective film 21. This structure of the end effector 20 prevents the harvest object T from colliding with the edge 22a of the housing 22 of the end effector 20 while the harvest object T is being sucked in.

The end effector 20 may include a closer 23 (see FIG. 5) that impedes the flow of air from the discharge port G to the outside of the end effector 20 and allows the harvest object T to move from the discharge port G to the outside. The closer 23 includes, for example, a plurality of flexible sheets (e.g., rubber or elastomer seats). When the harvest object T is not sucked in, the plurality of sheets are placed on top of each other to close the discharge port G. As such, resistance is generated against the flow of air from the discharge port G to the outside of the end effector 20. When the sucked in harvest object T moving from the suction port E toward the discharge port G collides with the closer 23, the plurality of flexible sheets of the closer 23 are opened, and the harvest object T is allowed to be discharged from the discharge port G. Such a closer 23 facilitates sufficiently lowering the air pressure in the internal passage of the end effector 20 at the time when the harvest object T is sucked in. The closer 23 may be disposed in the internal passage rearward of the connection port M so as to close the internal passage (close the discharge port G), or may be disposed outside the end effector 20 so as to close the internal passage G (close the discharge port G). The closer 23 is fixed to the end effector 20 by a fastener, such as a screw.

The structure of the closer 23 is not limited to the example described herein. The closer 23 may include an electromagnetically openable shutter. In this case, for example, when the harvest object T is detected at a predetermined position in the internal passage (a position frontward of the closer 23), the controller 40 may open the closer 23, which is a shutter. As yet another example, the closer 23 may be configured to open in response to the drop of the air pressure in the internal passage when the harvest object T is sucked in.

As shown in FIG. 5, the internal passage of the end effector 20 includes a harvest object sensor 24 to detect a harvest object T. For example, a photoelectric sensor may be used as the harvest object sensor 24. A harvest object T is detected when the harvest object T passes between a light-emitting element and a light-receiving element of the photoelectric sensor and the light of the light-emitting element is blocked by the harvest object T. The end effector 20 includes a plurality of harvest object sensors 24 arranged along a direction in which the harvest object T moves. In this way, it is possible to determine whether the harvest object T sucked in from the suction port E has properly moved to the discharge port G. The harvest object sensor 24 may not necessarily be a photoelectric sensor. For example, a camera may be used as the harvest object sensor 24.

As shown in FIG. 5, the end effector 20 includes a pressure sensor 25 to detect the air pressure of the internal passage. A pressure sensor is also disposed in the vacuum space to detect the air pressure therein. In an example, a pressure sensor 52a (see FIG. 3) is disposed in the vacuum chamber 52 to detect the air pressure therein.

An example of a process executed by the controller 40 will be described. As shown in FIG. 8, the controller 40 includes a harvest object position obtainer 41A, a suction port position adjuster 41B, a valve controller 41C, a vacuum generator controller 41D, and an abnormality determiner 41E as functions.

The harvest object position obtainer 41A obtains harvest object position information (e.g., coordinates of the harvest object in the coordinate system defined for the cart) from the image obtained by the image obtainer 5.

The suction port position adjuster 41B controls the suction port position adjuster P to put the suction port E closer to harvest object T based on the position information of the harvest object T acquired by the harvest object position obtainer 41A and the current position of the suction port E. The suction port position adjuster 41B sets a target position of the suction port E (a target position and a target attitude of the end effector 20) based on the position information of the harvest object T obtained by the harvest object position obtainer 41A, for example. Here, the target position of the suction port E is, for example, a position spaced away from the position of the harvest object T by a predetermined distance, and a position where the harvest object T and the end effector 20 directly face each other. The suction port position adjuster 41B drives a plurality of actuators 32 (see FIG. 8) of the suction port position adjuster P so as to move the suction port E to the target position based on the difference between the target position of the suction port E and the current position of the suction port E.

The valve controller 41C controls opening and closing of the switching valve 57 based on the relative position between the harvest object T and the end effector 20 (suction port E). Specifically, when the suction port E reaches the target position described above, the valve controller 41C drives the actuator 57a (see FIG. 8) provided for the switching valve 57 to switch the switching valve 57 from the closed state to the open state. Subsequently, the valve controller 41C returns the switching valve 57 from the open state to the closed state after a predetermined time has elapsed, for example. The predetermined time may correspond to the time in which the harvest object T moves through the internal passage. Alternatively, the valve controller 41C may return the switching valve 57 to the closed state based on the output of the harvest object sensor 24. For example, the valve controller 41C may return the switching valve 57 to the closed state when it is determined that the harvest object T has reached a predetermined position in the internal passage of the end effector 20 based on the output of harvest object sensor 24.

The control of the valve controller 41C is not limited to the example described herein. For example, the valve controller 41C may control the degree of opening of the switching valve 57. For example, the valve controller 41C may calculate the degree of opening of the switching valve 57 based on the size and type of harvest object T shown in the image obtained by the image obtainer 5. When the size of the harvest object T shown in the image is larger than a threshold value, the degree of opening of the switching valve 57 may be relatively increased, and when the size of the harvest object T shown in the image is smaller than the threshold value, the degree of opening of the switching valve 57 may be relatively decreased. In this manner, the switching valve 57 is prevented from being opened too much, which serves to easily maintain the air pressure of the vacuum space at a lower pressure and reduce the frequency of use of the vacuum generator 51.

The vacuum generator controller 41D controls the vacuum generator 51 based on an output of the pressure sensor 52a installed in the vacuum space (more specifically, vacuum chamber 52). Specifically, the vacuum generator controller 41D controls the vacuum generator 51 so that the air pressure in the vacuum space is lower than a threshold value. For example, if the air pressure in the vacuum space becomes higher than a threshold value due to the switching valve 57 set to the open state, the vacuum generator controller 41D drives the vacuum generator 51 until the air pressure in the vacuum space becomes lower than the threshold value. The vacuum generator controller 41D may stop driving the vacuum generator 51 when the air pressure in the vacuum space becomes lower than the threshold value.

The controller 40 may control the switching valve 57 based on the output of the pressure sensor 25 provided on the end effector 20. For example, the controller 40 may detect an abnormality inside the end effector 20 based on the output of the pressure sensor 25, and stop the use of the switching valve 57 if the abnormality is detected. As described above, the controller 40 includes the abnormality determiner 41E. The abnormality determiner 41E determines whether an abnormality has occurred inside the end effector 20 based on the output of the pressure sensor 25. When the switching valve 57 is temporarily set to the open state under the control of the valve controller 41C, the air pressure detected by the pressure sensor 25 is usually greatly reduced. In contrast, for example, when the foreign substances remain in the connection port M of the internal passage, the air pressure of the internal passage is not greatly reduced even if the switching valve 57 is set to the open state. As such, the abnormality determiner 41E is able to detect an abnormality (residual foreign substances) inside the end effector 20 based on the output of the pressure sensor 25. If such an anomaly is detected, the controller 40 may stop harvesting the harvest object T.

An example of the process executed by the controller 40 will be described.

The harvest object position obtainer 41 obtains position information of a harvest object T from the image obtained by the image obtainer 5 (S101). The suction port position adjuster 41B controls the suction port position adjuster P based on the position information of the harvest object T obtained in S101 and the current position of the suction port E to move the suction port E toward the harvest object T (S102). The suction port position adjuster 41B determines whether the relative position between the suction port E and the harvest object T has reached a predetermined target relative position (S103), and repeats the process of S102 and S103 until the relative position between the suction port E and the harvest object T reaches the target relative position.

The vacuum generator controller 41D determines whether the air pressure in the vacuum space (more specifically, vacuum chamber 52) is lower than a threshold value (S104). If the air pressure in the vacuum space is not lower than the threshold value, the vacuum generator controller 41D drives the vacuum generator 51 to lower the air pressure in the vacuum space (S105).

On the other hand, in S104, if the air pressure of the vacuum space is lower than the threshold value, the valve controller 41C sets the switching valve 57 to the open state (S106), and returns the switching valve 57 to the closed state after the predetermined time has elapsed (S107). At this time, the abnormality determiner 41E determines whether variations in the air pressure in the internal passage of the end effector 20 are normal based on the output of the pressure sensor 25 (S108). If the variations in the air pressure in the internal passage are not normal, the abnormality determiner 41E records such information in the memory of the controller 40. The controller 40 may drive a warning device (not shown) to notify the abnormality to the operator. The above is an example of the process executed by the controller 40.

As described above, a movable harvesting apparatus 1 includes a movable cart 3, an image obtainer 5 to obtain an image including a harvest object T shown thereon, a harvest object position obtainer 41A to obtain position information of the harvest object T based on the image, an end effector 20 including a suction port E to suck in the harvest object T, a position adjuster P to move the suction port E toward the harvest object T based on the position information of the harvest object T, a vacuum generator 51, a vacuum spaces (52 to 55) in which a vacuum is generated by the vacuum generator 51, a switching valve 57 disposed in a path from the vacuum spaces to the suction port E, and a controller 40 configured or programmed to control opening and closing of the switching valve 57. This movable harvesting apparatus 1 facilitates adjusting a sucking force using the switching valve 57. Alternatively, even if the vacuum generator 51 is temporarily stopped, a vacuum that has been generated in the vacuum space by temporarily setting the switching valve 57 to the open state enables the harvest object T to be sucked in.

The controller 40 controls opening and closing of the switching valve 57 based on a relative position between the harvest object T and the end effector 20. This enables appropriate suction.

The end effector 20 includes an internal passage in which the harvest object T sucked in from the suction port E moves.

The end effector 20 includes a pressure sensor 25 to detect the air pressure of the internal passage, and the controller 40 controls the switching valve 57 based on an output of the pressure sensor 25. This structure stops sucking in of the harvest object T when an abnormality in the end effector 20 (e.g., remaining foreign substances) occurs, for example.

The internal passage includes an inner surface along a direction in which the harvest object T moves and a connection port M that opens to the inner surface, and the vacuum space (pipe 55 in the present example of harvesting apparatus 1) is connected to the connection port M. This structure prevents the connection port M from interfering with the movement of the harvest object T in the internal passage.

The end effector 20 includes the suction port E on the front side of the internal passage in a moving direction of the harvest object T, and includes a discharge port G to discharge the harvest object T on the rear side of the internal passage in the moving direction of the harvest object T. This structure accumulates a plurality of harvest objects T at a position away from the end effector 20 in a discharging direction. As a result, the harvesting work efficiency is improved.

The end effector 20 includes a closer 23 to close the internal passage so as to impede the flow of air from the discharge port G to the outside and allow the harvest object T to be discharged from the discharge port G to the outside. Such a closer 23 facilitates sufficiently lowering the air pressure in the internal passage of the end effector 20 at the time when the harvest object T is sucked in.

The end effector 20 may include a harvest object sensor 24 to detect the harvest object T in the internal passage. This facilitates determining whether harvesting has been appropriately performed based on an output of the harvest object sensor 24.

The end effector 20 may include an internal passage in which the harvest object T sucked in from the suction port E moves, and a volume of the vacuum space may be larger than a volume of the internal passage. This facilitates maintaining the air pressure of the vacuum space at a low value.

The suction system B includes a vacuum chamber as an element of the vacuum space. This structure further facilitates maintaining the air pressure of the vacuum space at a low value.

The suction system B includes a pressure sensor 52a to detect the air pressure of the vacuum space, and the controller 40 controls the switching valve 57 based on an output of the pressure sensor 52a. This structure improves or optimizes the sucking force acting on the harvest object T.

A harvesting unit includes an end effector 20 including a suction port E to suction a harvest object T, a vacuum generator 51, vacuum spaces (52 to 55) in which a vacuum is generated by the vacuum generator 51, a switching valve 57 disposed in a path from the vacuum spaces to the suction port E, and a controller 40 to control opening and closing of the switching valve 57. This harvesting unit facilitates adjusting the sucking force by the switching valve 57, for example. Alternatively, even if the vacuum generator 51 is temporarily stopped, it is possible to suck in the harvest object T by using a vacuum generated in the vacuum space by temporarily setting the switching valve 57 to an open state.

The movable harvesting apparatus disclosed herein is not limited to the harvesting apparatus 1 described above. For example, depending on the shape of the end effector 20, the switching valve 57 may be provided inside the end effector 20, and a portion of the vacuum space may be also provided inside the end effector 20.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A movable harvesting apparatus comprising:
    a movable cart;
    an image obtainer to obtain an image including a harvest object shown thereon;
    a harvest object position obtainer to obtain position information of the harvest object based on the image;
    an end effector including a suction port to suck in the harvest object;
    a position adjuster to move the suction port toward the harvest object based on the position information of the harvest object;
    a vacuum generator;
    a vacuum space in which a vacuum is generated by the vacuum generator;
    a switching valve located along a path from the vacuum space to the suction port; and
    a controller configured or programmed to control opening and closing of the switching valve; wherein
    the controller is configured or programmed to control opening and closing of the switching valve based on a relative position between the harvest object and the end effector.

2. The movable harvesting apparatus according to claim 1, wherein the end effector includes an internal passage in which the harvest object sucked in from the suction port moves.

3. The movable harvesting apparatus according to claim 2, wherein the end effector includes a first pressure sensor to detect an air pressure of the internal passage; and the controller is configured or programmed to control the switching valve based on an output of the first pressure sensor.

4. The movable harvesting apparatus according to claim 2, wherein the internal passage includes an inner surface along a direction in which the harvest object moves and a connection port that opens to the inner surface; and the vacuum space is connected to the connection port.

5. The movable harvesting apparatus according to claim 2, wherein the end effector includes the suction port on one side of the internal passage in a moving direction of the harvest object, and includes a discharge port to discharge the harvest object on another side of the internal passage in the moving direction of the harvest object.

6. The movable harvesting apparatus according to claim 5, wherein the end effector includes a closer to close the internal passage so as to impede a flow of air from the discharge port to outside and allow the harvest object to be discharged from the discharge port to the outside.

7. The movable harvesting apparatus according to claim 2, wherein the end effector includes a sensor to detect the harvest object in the internal passage.

8. The movable harvesting apparatus according to claim 1, wherein the end effector includes an internal passage through which the harvest object sucked in from the suction port moves; and a volume of the vacuum space is larger than a volume of the internal passage.

9. The movable harvesting apparatus according to claim 8, wherein the vacuum space includes a vacuum chamber.

10. The movable harvesting apparatus according to claim 8, further comprising:

a pressure sensor to detect an air pressure of the vacuum space; wherein the controller is configured or programmed to control the switching valve based on an output of the pressure sensor.

* * * * *